(12) United States Patent
Scott et al.

(10) Patent No.: US 10,478,723 B2
(45) Date of Patent: Nov. 19, 2019

(54) TRACK BASED PLAY SYSTEMS

(71) Applicant: Microsoft Technology Licensing, LLC, Redmond, WA (US)

(72) Inventors: James William Scott, Cambridge (GB); Haiyan Zhang, London (GB); Nicolas Villar, Cambridge (GB); Alexandra Keeley Bunting, London (GB)

(73) Assignee: Microsoft Technology Licensing, LLC, Redmond, WA (US)

( * ) Notice: Subject to any disclaimer, the term of this patent is extended or adjusted under 35 U.S.C. 154(b) by 613 days.

(21) Appl. No.: 14/320,154

(22) Filed: Jun. 30, 2014

(65) Prior Publication Data

US 2015/0375114 A1 Dec. 31, 2015

(51) Int. Cl.
*A63F 13/40* (2014.01)
*A63F 3/00* (2006.01)
(Continued)

(52) U.S. Cl.
CPC .......... *A63F 13/40* (2014.09); *A63F 3/00097* (2013.01); *A63F 3/00529* (2013.01);
(Continued)

(58) Field of Classification Search
CPC ...... A63F 13/65; A63F 3/00097; A63F 13/40; A63F 3/00; A63F 9/24; A63F 7/36; G06F 3/002; G06F 3/017; G06F 3/00–01
See application file for complete search history.

(56) References Cited

U.S. PATENT DOCUMENTS 6,031,549 A 2/2000 Hayes-Roth
6,149,490 A 11/2000 Hampton et al.
(Continued)

FOREIGN PATENT DOCUMENTS

CN 103096987 A 5/2013
CN 103236720 A 8/2013
(Continued)

OTHER PUBLICATIONS

"International Search Report & Written Opinion for PCT Patent Application No. PCT/US2015/038217", dated Sep. 30, 2015, Filed Date: Jun. 29, 2015, 12 Pages.
(Continued)

*Primary Examiner* — David Duffy
*Assistant Examiner* — Ankit B Doshi
(74) *Attorney, Agent, or Firm* — Ray Quinney & Nebeker P.C.; John O. Carpenter

(57) ABSTRACT

Track based play systems are described which comprise a set of physical play pieces and an associated computer game. In an embodiment, a user may arrange some or all of the play pieces in the set to form a path. The computer game is arranged to infer a virtual model of the path defined by the user-created arrangement of the play pieces. The inference may be based on data communicated by one or more the play pieces to the game or based on data from a local sensing device such as a camera which views the relative positions of the play pieces. Having inferred the path, the game constrains a virtual or physical object to the path within the game play and renders a graphical user interface showing at least a portion of the path.

17 Claims, 10 Drawing Sheets

(51) Int. Cl.
*A63F 7/36* (2006.01)
*G06F 3/00* (2006.01)
*G06F 3/01* (2006.01)
*A63F 13/65* (2014.01)
*A63F 9/24* (2006.01)

(52) U.S. Cl.
CPC ............ *A63F 7/3622* (2013.01); *A63F 13/65* (2014.09); *G06F 3/002* (2013.01); *G06F 3/017* (2013.01); *A63F 2003/00662* (2013.01); *A63F 2003/00996* (2013.01); *A63F 2007/3662* (2013.01); *A63F 2009/2442* (2013.01); *A63F 2009/2489* (2013.01); *A63F 2300/1068* (2013.01)

(56) References Cited

U.S. PATENT DOCUMENTS

| | | | |
|---|---|---|---|
| 6,159,101 | A | 12/2000 | Simpson |
| 6,290,565 | B1 | 9/2001 | Galyean, III et al. |
| 6,305,688 | B1 | 10/2001 | Waroway |
| 6,454,624 | B1 | 9/2002 | Duff et al. |
| 6,572,431 | B1 | 6/2003 | Maa |
| 6,575,802 | B2 | 6/2003 | Yim et al. |
| 6,629,591 | B1 | 10/2003 | Griswold et al. |
| 6,682,392 | B2 | 1/2004 | Chan |
| 6,773,322 | B2 | 8/2004 | Gabai et al. |
| 6,773,344 | B1 | 8/2004 | Gabai et al. |
| 6,877,096 | B1 | 4/2005 | Chung et al. |
| 6,923,717 | B2 | 8/2005 | Mayer et al. |
| 6,954,659 | B2 | 10/2005 | Tushinsky et al. |
| 7,154,363 | B2 | 12/2006 | Hunts |
| 7,439,972 | B2 | 10/2008 | Timcenko |
| 7,641,476 | B2 | 1/2010 | Didur et al. |
| 7,695,338 | B2 | 4/2010 | Dooley et al. |
| 7,749,089 | B1 | 6/2010 | Briggs et al. |
| 8,058,837 | B2 | 11/2011 | Beers et al. |
| 8,079,846 | B1 | 12/2011 | Cookson |
| 8,087,939 | B2 | 1/2012 | Rohrbach et al. |
| 8,157,611 | B2 | 4/2012 | Zheng |
| 8,228,202 | B2 | 7/2012 | Buchner et al. |
| 8,257,157 | B2 | 9/2012 | Polchin |
| 8,317,566 | B2 | 11/2012 | Ganz |
| 8,332,544 | B1 | 12/2012 | Ralls et al. |
| 8,475,275 | B2 | 7/2013 | Weston et al. |
| 8,548,819 | B2 | 10/2013 | Chan et al. |
| 8,585,476 | B2 | 11/2013 | Mullen |
| 8,628,414 | B2 | 1/2014 | Walker et al. |
| 8,825,187 | B1 | 9/2014 | Hamrick et al. |
| 8,854,925 | B1 | 10/2014 | Lee et al. |
| 9,696,757 | B2 | 7/2017 | Scott et al. |
| 9,919,226 | B2 | 3/2018 | Scott et al. |
| 2002/0196250 | A1 | 12/2002 | Anderson et al. |
| 2003/0013524 | A1 | 1/2003 | Cochran |
| 2003/0030595 | A1 | 2/2003 | Radley-Smith |
| 2004/0053690 | A1 | 3/2004 | Fogel et al. |
| 2005/0132290 | A1 | 6/2005 | Buchner et al. |
| 2005/0227811 | A1 | 10/2005 | Shum et al. |
| 2005/0255916 | A1 | 11/2005 | Chen |
| 2006/0058018 | A1 | 3/2006 | Toulis et al. |
| 2007/0097832 | A1 | 5/2007 | Koivisto et al. |
| 2007/0155505 | A1 | 7/2007 | Huomo |
| 2007/0188444 | A1 | 8/2007 | Vale et al. |
| 2007/0198117 | A1 | 8/2007 | Wajihuddin |
| 2007/0218988 | A1 | 9/2007 | Lucich |
| 2007/0279852 | A1 | 12/2007 | Daniel et al. |
| 2007/0293319 | A1 | 12/2007 | Stamper et al. |
| 2008/0014835 | A1 | 1/2008 | Weston et al. |
| 2008/0045283 | A1 | 2/2008 | Stamper et al. |
| 2008/0076519 | A1 | 3/2008 | Chim |
| 2008/0153559 | A1 | 6/2008 | De Weerd |
| 2008/0280684 | A1 | 11/2008 | McBride et al. |
| 2009/0008875 | A1 | 1/2009 | Wu et al. |
| 2009/0029771 | A1 | 1/2009 | Donahue |
| 2009/0047865 | A1 | 2/2009 | Nakano |
| 2009/0048009 | A1 | 2/2009 | Brekelmans et al. |
| 2009/0053970 | A1 | 2/2009 | Borge |
| 2009/0081923 | A1 | 3/2009 | Dooley et al. |
| 2009/0082879 | A1 | 3/2009 | Dooley et al. |
| 2009/0094287 | A1 | 4/2009 | Johnson et al. |
| 2009/0104988 | A1 | 4/2009 | Enge et al. |
| 2009/0197658 | A1* | 8/2009 | Polchin .................. A63F 13/02 463/9 |
| 2009/0206548 | A1 | 8/2009 | Hawkins et al. |
| 2009/0251419 | A1 | 10/2009 | Radely-Smith |
| 2009/0265642 | A1 | 10/2009 | Carter et al. |
| 2009/0291764 | A1 | 11/2009 | Kirkman et al. |
| 2009/0307592 | A1 | 12/2009 | Kalanithi et al. |
| 2010/0009747 | A1 | 1/2010 | Reville et al. |
| 2010/0026698 | A1 | 2/2010 | Reville et al. |
| 2010/0035726 | A1 | 2/2010 | Fisher et al. |
| 2010/0103075 | A1 | 4/2010 | Kalaboukis et al. |
| 2010/0113148 | A1 | 5/2010 | Haltovsky et al. |
| 2010/0144436 | A1 | 6/2010 | Marks et al. |
| 2010/0167623 | A1 | 7/2010 | Eyzaguirre et al. |
| 2010/0274902 | A1 | 10/2010 | Penman et al. |
| 2010/0279823 | A1 | 11/2010 | Waters |
| 2010/0331083 | A1 | 12/2010 | Maharbiz |
| 2011/0021109 | A1 | 1/2011 | Le et al. |
| 2011/0172015 | A1 | 7/2011 | Ikeda et al. |
| 2011/0215998 | A1* | 9/2011 | Fitzgerald ............... G06F 3/002 345/156 |
| 2011/0239143 | A1 | 9/2011 | Ye et al. |
| 2012/0007817 | A1 | 1/2012 | Heatherly et al. |
| 2012/0050198 | A1 | 3/2012 | Cannon |
| 2012/0052931 | A1 | 3/2012 | Jaqua et al. |
| 2012/0052934 | A1 | 3/2012 | Maharbiz et al. |
| 2012/0122059 | A1 | 5/2012 | Schweikardt et al. |
| 2012/0190453 | A1 | 7/2012 | Skaff et al. |
| 2012/0268360 | A1 | 10/2012 | Mikhailov |
| 2012/0286629 | A1 | 11/2012 | Johnson et al. |
| 2012/0295700 | A1 | 11/2012 | Reiche |
| 2012/0295704 | A1 | 11/2012 | Reiche et al. |
| 2013/0109267 | A1 | 5/2013 | Schweikardt et al. |
| 2013/0109272 | A1 | 5/2013 | Rindlisbacher |
| 2013/0122753 | A1 | 5/2013 | Blakborn |
| 2013/0165223 | A1 | 6/2013 | Leyland et al. |
| 2013/0173658 | A1 | 7/2013 | Adelman et al. |
| 2013/0196766 | A1 | 8/2013 | Leyland et al. |
| 2013/0196770 | A1 | 8/2013 | Barney et al. |
| 2013/0231193 | A1 | 9/2013 | Heatherly et al. |
| 2013/0271390 | A1 | 10/2013 | Lyons et al. |
| 2013/0288563 | A1 | 10/2013 | Zheng et al. |
| 2013/0324239 | A1 | 12/2013 | Ur et al. |
| 2014/0002580 | A1 | 1/2014 | Bear et al. |
| 2014/0011595 | A1 | 1/2014 | Muller |
| 2014/0055352 | A1 | 2/2014 | Davis et al. |
| 2014/0141865 | A1 | 5/2014 | Tropper et al. |
| 2014/0213357 | A1 | 7/2014 | Claffey |
| 2014/0235198 | A1 | 8/2014 | Lee et al. |
| 2014/0235353 | A1 | 8/2014 | Witchey |
| 2015/0258435 | A1 | 9/2015 | Zhang et al. |
| 2016/0101361 | A1 | 4/2016 | Scott et al. |
| 2016/0101364 | A1 | 4/2016 | Scott et al. |
| 2016/0104321 | A1 | 4/2016 | Scott et al. |
| 2017/0232347 | A1 | 8/2017 | Scott et al. |

FOREIGN PATENT DOCUMENTS

| | | |
|---|---|---|
| CN | 203434701 U | 2/2014 |
| CN | 103999012 A | 8/2014 |
| JP | H0920533 A | 8/1997 |
| JP | 2003038842 A | 2/2003 |
| JP | 2011036418 A | 2/2011 |
| JP | 2013135374 A | 7/2013 |
| WO | 2001012285 A1 | 2/2001 |
| WO | 2001069799 A2 | 9/2001 |
| WO | 2001069829 A2 | 9/2001 |
| WO | 2009037679 A1 | 3/2009 |
| WO | 2011112498 A1 | 9/2011 |

(56) References Cited

FOREIGN PATENT DOCUMENTS

| WO | 2012160055 A1 | 11/2012 |
|---|---|---|
| WO | 2015138267 A1 | 9/2015 |

OTHER PUBLICATIONS

Gilpin, et al., "Robot pebbles: One centimeter modules for programmable matter through self-disassembly", 2010 IEEE International Conference on Robotics and Automation, May 3, 2010.
Schweikardt, Eric, "Designing Modular Robots", Nov. 19, 2013, Available at: http://www.cmu.edu/architecture/research/grad_work/2009_phdcd_schweikardt_eric.pdf.
"Skylanders Swapforce", Sep. 11, 2013, Available at: http://www.skylanders.com/swapforce.
"Disney Infinity", Nov. 19, 2013, Available at: https://infinity.disney.com/en-gb.
"Cubelets", Sep. 11, 2013, Available at: http://www.modrobotics.com/.
"Shapeways", Nov. 19, 2013, Available at: http://shapeways.com/.
Lampe, et al., "The Augmented Knight's Castle—Integrating Mobile and Pervasive Computing Technologies into Traditional Toy Environments", Nov. 21, 2013, Available at: http://www.vs.inf.ethz.ch/publ/papers/mlampe-pg07-akc.pdf.
Kikin-Gil, Ruth, "BuddyBeads", Published on: Oct. 10, 2006, Available at: http://www.ruthkikin.com/Images/r.kikin-gil_thesis2005.pdf.
Fortmann, et al., "Illumee: Aesthetic Light Bracelet as a Wearable Information Display for Everyday Life", In Proceedings of ACM Conference on Pervasive and Ubiquitous Computing Adjunct Publication, Sep. 8, 2013, 4 pages.
Labrune, et al., "Telebeads: Social Network Mnemonics for Teenagers", In Proceedings of Conference on Interaction Design and Children, Jun. 7, 2006, 8 pages.
Ahde, et al., "Hello—Bracelets Communicating Nearby Presence of Friends", In Proceedings of the Tenth Anniversary Conference on Participatory Design, Sep. 30, 2008, 3 pages.
Kuniavsky, Mike, "Smart Things: Ubiquitous Computing User Experience Design", Published on: Sep. 2010, Available at: http://books.google.co.in/books?id=-WLyUCBBUVAC&pg=PA89&lpg=PA89&dq=Interactive+Smart+Beads+and+Bracelet&source=bl&ots=HA6ZA1Bssz&sig=x1s2X1pGZle-5oVqX3uZA0jZ1ks&hl=en&sa=X&ei=BxWLUqSGI4X3rQfh9oDYCg&ved=0CFAQ6AEwBg#v=onepage&q=Interactive%20Smart%20Beads%20and%20Bracelet&f=false.
Robertson, Judy, "Encouraging Girls to Study Geeky Subjects (Part 2): Programmable Bracelets", Published on: Apr. 12, 2010, Available at: http://cacm.acm.org/blogs/blog-cacm/85132-encouraging-girls-to-study-geeky-subjects-part-2-programmable-bracelets/fulltext.
Lampe, et al., "Integrating Interactive Learning Experiences into Augmented Toy Environments", In Proceedings of the Pervasive Learning Workshop at the Pervasive Conference, May 2007, 8 pages.
"Seebo Platform", Published on: Jun. 22, 2013, Available at: http://www.seebo.com/.
Raffle, et al., "Topobo: A Constructive Assembly System with Kinetic Memory", In Proceedings of the SIGCHI Conference on Human Factors in Computing Systems, Apr. 24, 2004.
Schmid, et al., "Networking Smart Toys with Wireless ToyBridge and ToyTalk", In IEEE International Conference on Computer Communications, Apr. 10, 2011, 2 pages.
Patrizia, et al., "A Robotic Toy for Children with special needs: From requirements to Design", In IEEE 11th International Conference on Rehabilitation Robotics, Nov. 20, 2013, 6 pages.
Zaino, Jennifer, "JNFC Technology Brings New Life to Games", In Journal of RFID, Oct. 1, 2012, 10 pages.
U.S. Appl. No. 14/203,991, Zhang, et al., "Generation of Custom Modular Objects", filed Mar. 11, 2014.

U.S. Appl. No. 14/204,239, Zhang, et al., "Gaming System for Modular Toys", filed Mar. 11, 2014.
U.S. Appl. No. 14/204,483, Saul, et al., "Interactive Smart Beads", filed Mar. 11, 2014.
U.S. Appl. No. 14/204,740, Saul, et al., "A Modular Construction for Interacting with Software", filed Mar. 11, 2014.
U.S. Appl. No. 14/204,929, Zhang, et al., "Storing State for Physical Modular Toys", filed Mar. 11, 2014.
U.S. Appl. No. 14/205,077, Zhang, et al., "Data Store for a Modular Assembly System", filed Mar. 11, 2014.
"Disney Infinity", Published on: Aug. 25, 2013, Available at: http://www.essentialkids.com.au/entertaining-kids/games-and-technology/disney-infinity-20130823-2sgg0.html.
Marshall, Rick, "Skylanders: Swap Force Review" Published on: Nov. 1, 2013, Available at: http://www.digitaltrends.com/game-reviews/skylanders-swap-force-review/.
Jennings, et al., "CONSTRUCT/VizM: A Framework for Rendering Tangible constructions", In Proceedings of the 14th Congress of the Iberoamerican Society of Digital Graphics, Nov. 17, 2010, 4 pages.
Kitamura, et al., "Real-time 3D Interaction with ActiveCube", In Proceedings of Extended Abstracts on Human Factors in Computing Systems, Mar. 31, 2001, 2 pages.
"Siftables are Changing the Shape of Computing", Published on: May 9, 2010, Available at: http://singularityhub.com/2010/05/05/siftables-are-changing-the-shape-of-computing/.
'Cuff—fashion wearable bracelets', 2014 Available at: http://www.elle.com/_mobile/news/fashion-accessories/cufflinc-wearable-techsrc=spr_TWITTER&spr_id=1448_51714286&linkId=7882609.
'Prodigy—Kickstarter', 2014 Available at: https://www.kickstarter.com/projects/121511007/prodigy-the-game.
CONSTRUKTS—Part time UI/UX and Engineer Positions, 2014 Available at: http://www.construkts.com.
"International Preliminary Report on Patentability Issued in PCT Application No. PCT/US2015/038217", dated Oct. 18, 2016, 10 Pages.
"Second Written Opinion Issued in PCT Application No. PCT/US2015/038217", dated Jun. 8, 2016, 8 Pages.
Betters, "LeapFrog LeapBand is an activity band for kids with virtual pet capabilities," downloaded from https://uk.news.yahoo.com/leapfrog-leapband-activity-band-kids-virtual-pet-capabilities-231500937.html?guccounter=1, 1 p. (May 2014).
Final Office Action dated Jul. 9, 2018, from U.S. Appl. No. 15/582,146, 25 pp.
International Preliminary Report on Patentability dated Jul. 21, 2016, from International Patent Application No. PCT/US2015/054103, 5 pp.
International Search Report and Written Opinion dated Feb. 1, 2016, from International Patent Application No. PCT/US2015/054103, 12 pp.
Murphy, "The Reinvented Tamagotchi: Bright, Flashy and Just as Needy," downloaded from: http://mashable.com/2014/02/20/tamagotchi-friends/, 22 pp. (Feb. 2014).
Office Action dated Oct. 6, 2016, from U.S. Appl. No. 14/509,940, 26 pp.
Office Action dated Apr. 6, 2017, from U.S. Appl. No. 14/509,862, 15 pp.
Office Action dated Oct. 5, 2017, from U.S. Appl. No. 15/582,146, 35 pp.
Office Action dated Jun. 13, 2018, from U.S. Appl. No. 14/509,919, 18 pp.
Office Action dated Nov. 19, 2018, from U.S. Appl. No. 15/582,146, 22 pp.
Persson, "Minecraft," downloaded from: https://web.archive.org/web/20140531165512/https://minecraft.net/game, 3 pp. (May 2014).
"Proxi In-Device Charging Solution", Retrieved From: http://powerbyproxi.com/consumer-electronics/industrial/proxi-in-device-charging-solution/, 8 pp. (May 19, 2013).
Webster, "Nex Band is a smart, modular charm bracelet for gaming on your wrist," downloaded from: http://www.theverge.com/2014/2/13/5289404/nex-band-is-a-smart-modular-charm-bracelet, 4 pp. (Feb. 2014).

(56) References Cited

OTHER PUBLICATIONS

"World of Warcraft Crafting Skills", Retrieved From: https://web.archive.org/web/20140527091410/http://us.battle.net/wow/en/, May 27, 2014, 3 Pages.

Wu, "Customizable Wristband Sensor for Healthcare Monitoring 24/7," downloaded from: http://marblar.com/idea/493o7, 4 pp. (Nov. 2013).

Communication pursuant to Article 94(3) EPC dated Feb. 14, 2019, from European Patent Application No. 15782188.5, 4 pp.

Final Office Action dated Jan. 2, 2019, from U.S. Appl. No. 14/509,919, 18 pp.

"First office action and Search Report Issued in Chinese Patent Application No. 201580054924.2", dated May 24, 2019, 13 Pages.

"Final Office Action Issued in U.S. Appl. No. 15/582,146", dated Apr. 4, 2019, 25 Pages.

"Second Office Action Issued in Chinese Patent Application No. 201580054924.2", dated Aug. 9, 2019, 9 Pages.

"Third Office Action Issued in Chinese Patent Application No. 201580054924.2", dated Sep. 20, 2019, 7 Pages.

"Office Action Issued in Japanese Patent Application No. 2017-518972", dated Sep. 24, 2019, 9 Pages.

\* cited by examiner

TRACK BASED PLAY SYSTEMS

BACKGROUND

There are many ways that a user can interact with a computer game and typically a user controls the game via a keyboard and mouse, games controller (which may be handheld or detect body movement) or touch screen, dependent upon the platform on which the game is being played (e.g. computer, games console or handheld device). A number of games have also been developed in which gameplay is enabled (or unlocked) through the use of physical character toys which are placed on a custom base connected to a games console. By placing different toys on the custom base, different gameplay is enabled.

The embodiments described below are not limited to implementations which solve any or all of the disadvantages of known apparatus for interacting with computer games.

SUMMARY

The following presents a simplified summary of the disclosure in order to provide a basic understanding to the reader. This summary is not an extensive overview of the disclosure and it does not identify key/critical elements or delineate the scope of the specification. Its sole purpose is to present a selection of concepts disclosed herein in a simplified form as a prelude to the more detailed description that is presented later.

Track based play systems are described which comprise a set of physical play pieces and an associated computer game. In an embodiment, a user may arrange some or all of the play pieces in the set to form a path. The computer game is arranged to infer a virtual model of the path defined by the user-created arrangement of the play pieces. The inference may be based on data communicated by one or more the play pieces to the game or based on data from a local sensing device such as a camera which views the relative positions of the play pieces. Having inferred the path, the game constrains a virtual or physical object to the path within the game play and renders a graphical user interface showing at least a portion of the path.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein.

Like reference numerals are used to designate like parts in the accompanying drawings.

DETAILED DESCRIPTION

The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples.

Figure 1:
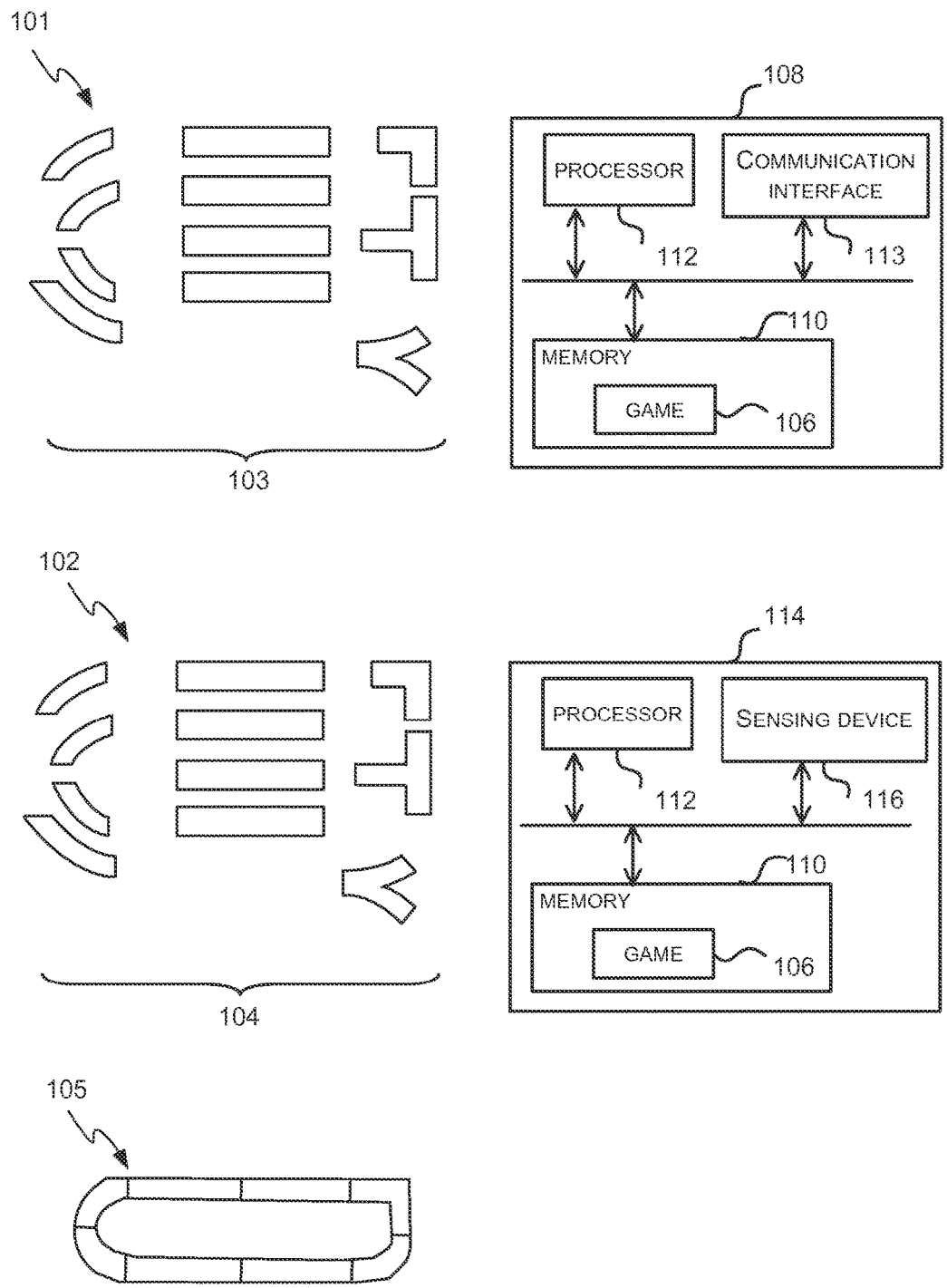
FIG. 1 shows schematic diagrams of two example play systems and a schematic diagram of an example arrangement of a subset of the physical play pieces.

FIG. 1 shows schematic diagrams of two example play systems 101-102 which each comprise a set of physical play pieces 103-104 and a computer game 106 and a schematic diagram of an example arrangement 105 of a subset of the physical play pieces 103-104. In both example play systems 101-102, the game 106 uses a user's arrangement 105 of the plurality of physical play pieces 103-104 as an input and so the game 106 may be described as being associated with the set of physical play pieces 103-104. During game play, the arrangement 105 may remain the same or a user may dynamically re-arrange the physical play pieces to create new arrangements and/or modify an existing arrangement.

As described in more detail below, the individual physical play pieces which form the set may all be the same shape or may have different shapes (as shown in FIG. 1) and the shapes of the pieces may be regular shapes (e.g. square or rectangular) or irregular in shape (e.g. as is the case for many of the pieces shown in FIG. 1). The pieces may be shaped such that they are interlocking or can otherwise connect to each other (e.g. via connectors on each piece). The connection between pieces may provide a physical connection and/or an electrical connection. In various examples, the pieces may be shaped such that they can be butted up to each other without any connecting mechanism joining the pieces together. Where the physical play pieces are shaped so that they can be butted up against each other or are interlocking, the play pieces within the set may be described as being compatible and may also be referred to as tiles. In further examples, the pieces may not be shaped so that they can be placed close together and a user may arrange them as they choose.

In the first example play system 101 shown in FIG. 1, the physical play pieces 103 are active pieces in that each piece actively communicates (i.e. sends/receives data) with other pieces and/or the associated game 106 to assist the game 106 to infer a shape of a path defined by the arrangement of the pieces and in various examples to infer a shape of a path defined by both the arrangement and the shape of the pieces (e.g. as in the case of the arrangement 105 shown in FIG. 1). In examples where inference is based on both the arrangement and the shape of the pieces, the set of pieces comprises pieces having different shapes (e.g. as shown in FIG. 1). Active pieces are described in more detail below with reference to FIG. 3. The associated computer game 106 runs on a computing device 108 which may be a desktop, laptop or tablet computer, a games console, a smart phone or any other computing device. In other examples, however, the computing device 108 may be integrated into one of the play pieces 103 and this is described in more detail with reference to FIG. 4. In the example system 101 shown in FIG. 1, the game 106 is stored in memory 110 in the computing device 108 and comprises device-executable instructions which are executed by a processor 112. The game 106 receives data from the active pieces 103 via a communication interface 113 in the computing device 108. It will be appreciated that the computing device 108 may also comprise additional elements and the computing device 108 is described in more detail below with reference to FIG. 10.

In the second example play system 102 shown in FIG. 1, the physical play pieces 104 are passive in that they do not actively communicate with each other or with the associated game. In the example system 102 shown in FIG. 1, the game 106 is stored in memory 110 in a computing device 114 and comprises device-executable instructions which are executed by a processor 112. Instead of receiving communications from one or more pieces (as in example 101), the game 106 senses the arrangement of the pieces using a sensing device 116 in the computing device 114 on which the game runs. As described above, the computing device 114 may be a desktop, laptop or tablet computer, a games console, a smart phone or any other computing device. It will be appreciated that the computing device 108 may also comprise additional elements and the computing device 114 is described in more detail below with reference to FIG. 10. The sensing device 116 may, for example, be a camera and image recognition/analysis system. Although the sensing device 116 is shown as part of the computing device 114, in other examples it may be part of a peripheral device connected to the computing device 114. In various examples, the sensing device 116 may be a Microsoft® Kinect®. Depending on the sensing technology, the passive physical play pieces 104 may be constructed to facilitate the job of sensing their arrangement. For example, for a depth-camera based system using infra-red light, the pieces may be (or may have parts that are) reflective in the infra-red spectrum. For visible light cameras, the pieces may include color or pattern combinations that are chosen to be easily recognized or differentiated from the background.

In a further example play system, the set of physical play pieces may comprise one or more active pieces and one or more passive pieces. In such an example, the active play pieces may detect their own arrangement (or configuration, e.g. orientation, which other play pieces they are connected or adjacent to, etc.) and also the arrangement of any proximate passive pieces and then communicate with other pieces and/or the game 106 to assist the game 106 to infer a shape of a path defined by the arrangement of all of the pieces.

Figure 2:
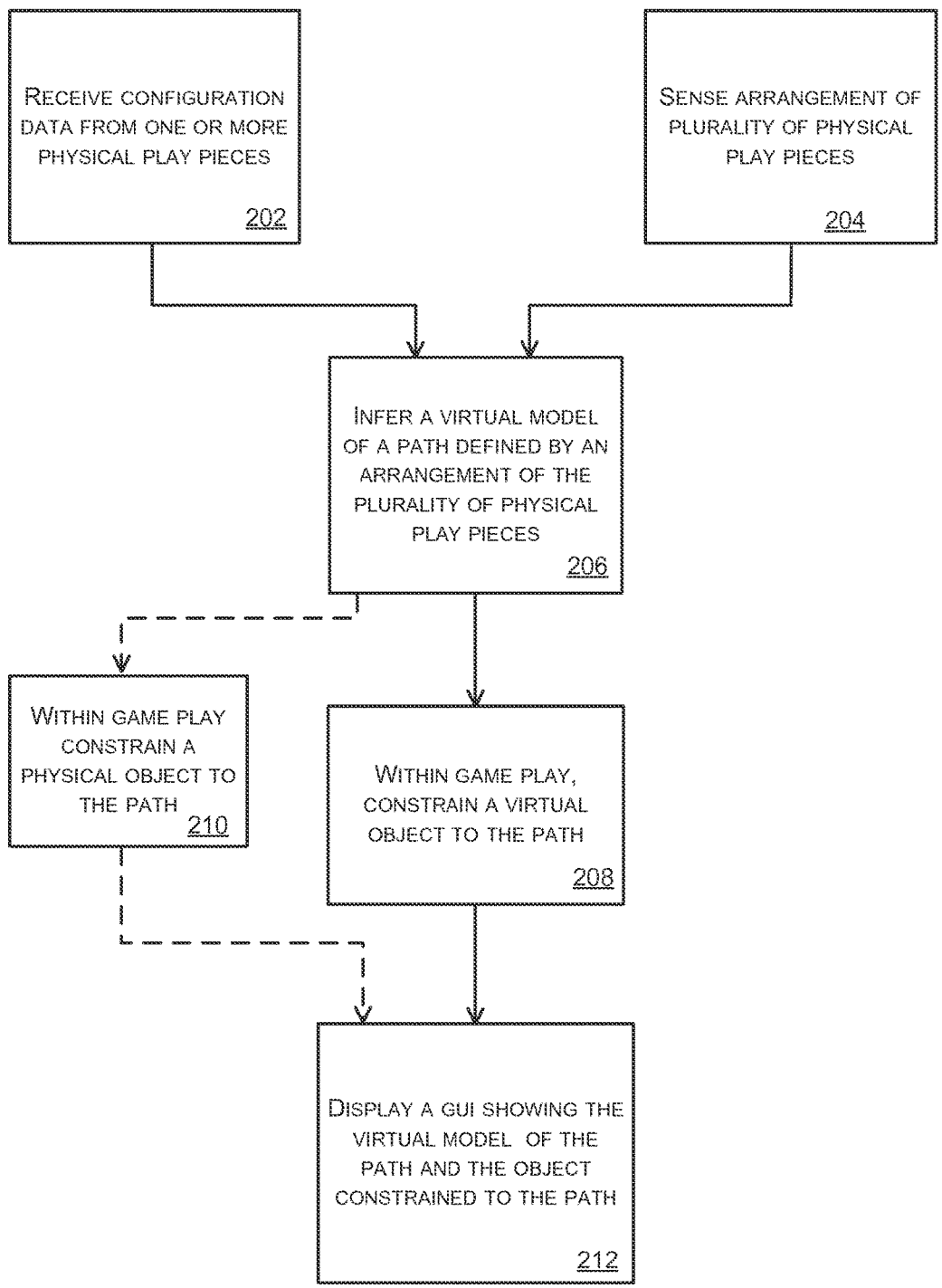
FIG. 2 shows a flow diagram of an example method of operation of a computer game.

The operation of the game 106, which may be referred to as an electronic game, a video game or computer game (because it runs on a computing device 108, 114 and comprises device-executable instructions even though that computing device may take any form), can be described with reference to FIG. 2. As shown in FIG. 2, the game 106 infers a virtual model of a path defined by an arrangement of physical play pieces (block 206), where these pieces may, for example, be the pieces 103-104 shown in FIG. 1. Dependent upon whether the pieces are active (as shown in example 101) or passive (as shown in example 102) or a combination of active and passive play pieces, the inference (in block 206) may be based on configuration data received from one or more physical play pieces (block 202) and/or on sensing the arrangement of play pieces (block 204). Where the pieces are active, the configuration data may be received from each of the play pieces (in block 202) or alternatively the configuration data may be collated by a subset of the play pieces (which in an extreme case may be a single play piece within the set) and the game may then receive configuration data from the subset of the play pieces.

The virtual model of the path can be inferred (in block 206) from the physical pieces in a number of ways depending on whether the pieces are active or passive, how they are sensed, and whether the pieces themselves constitute the path or whether the pieces constitute boundaries or waypoints that define the path implicitly (as described in more detail below with reference to FIG. 5). For active pieces which sense their interconnectivity, the shapes of the pieces and the interconnectivity information (which may include information concerning the sensed relative orientation of pieces as well as the identities of neighbor pieces, where the orientation is not fixed due to joints between the pieces being rigid) can be used to infer a real-world topology which can be directly mapped onto a virtual track path following a similar 2D or 3D layout. For passive pieces sensed through a remote sensing device 116, the sensor can determine the identity, location and relative orientation of the pieces which can feed into the above inference process as well. Where the pieces form walls between paths, the paths can be derived from the wall positions using a number of methods. One such method is to "invert" the sensed paths, i.e. to render them onto a virtual image (e.g. in black on a white background), and then to use computer vision techniques to look for white lines that remain, or to use a virtual robot which can only "walk" on white pixels to virtually explore and hence generate a topological map of which locations can be reached from other locations.

Having inferred a virtual model of a path (in block 206), the game constrains the position of a virtual and/or physical object to that path within the game play (blocks 208-210). In various examples, the configuration of at least a portion of the path (e.g. at least the part of the path where the object is currently located) and/or the object which is constrained to the path are reflected within a graphical user interface (GUI) of the game (block 212). In various examples, this comprises displaying a portion of the path, the object and/or a view from the path within the GUI. In addition, or instead, the reflection of the path within the GUI may comprise enabling user inputs to affect movement of an object along the path as part of the game play. This may be directly (e.g. by linking a user input to a particular motion along the path within the gameplay such as "left button=go left along path") or indirectly (where the object's actual motion is controlled by the game engine but the user inputs higher-level commands such as "stay put", "follow another object", "search for another object", etc.).

In examples where a virtual object is constrained to the path (in block 208), the edges of the virtual path may be treated, within the game play, like barriers or walls that the virtual object cannot pass through and various example game scenarios are described below. The motion of the virtual object along the path may be controlled by a physics engine within the game 106 and in various examples, the physics engine may also control the effect on the virtual object of hitting the edge of the virtual path (e.g. the object may bounce back off the wall). In various examples, there may be a feedback mechanism on the physical play pieces themselves (e.g. in the form of one or more LEDs) to indicate the current position (and hence also the motion) of the virtual object on the virtual path relative to the actual arrangement of the physical pieces. Any feedback mechanism may, in addition or instead be used to display the position (or motion) of a virtual object which is controlled by the game (e.g. to show its position relative to a virtual object controlled by the user or relative to a physical object constrained to the path and controlled by the user).

In examples where the physical object is constrained to the path (in block 210) this may be a result of the physical shape of the play pieces themselves (e.g. the play pieces may have one or more grooves or indentations in their surface along which the physical object moves), a constraining mechanism within the play pieces that is controlled by the game (e.g. electromagnets within the pieces that attract the object and are switched on and off by the game) and/or virtual in-game effects (e.g. such that if the physical object is removed from the path it disappears from within the virtual world depicted by the game). The physical object may be moved directly by the user (e.g. the user may push the object along the track) or indirectly by the user (e.g. via the game or other remote control device). Alternatively, the physical object may be controlled by the game without user input (e.g. it may be an autonomous object). When the game controls the physical object's movement, the object can be constrained to follow the path by restricting the control sequences to stay on the path. In various examples more subtle constraints may be used, whereby the game UI allows the user to control the movement of the object and leave the path, but if they do so, then in-game penalties occur (e.g. in a racing game, the object moves slower), or modifications to the control system are made (e.g. the steering is altered slightly to tend to move the object back towards the path).

There are many ways in which the GUI may reflect the configuration of at least a portion of the inferred path to the user (in block 212) and in various examples also display the object. In various examples the GUI may display a plan view (e.g. similar to a map) of the inferred path and/or a view of a part of the path as if seen from the position of the object (e.g. where the object is a vehicle, the view in the GUI may be as would be seen by an occupant of the vehicle). This may, for example, enable a user to appear (within the computer game) to be driving a vehicle around a path they have created in their own living room, where the path is defined by active pieces or passive pieces. Where the path is inferred based on passive pieces, the passive pieces may include items of furniture, cushions, etc. in the living room.

As described above, in various examples a user may re-arrange the physical pieces to create modify the arrangement during game play. This re-arrangement may result in the method shown in FIG. 2 being repeated (e.g. the game will infer a new path and then reflect this in the GUI and constrain a physical/virtual object to the new path).

Although the arrangement of pieces 105 shown in FIG. 1 is of a closed path, in various examples, a user may create a path which is not closed (e.g. it may have a start and a finish). In such examples, a user may be able to extend the path by removing parts of the arrangement (i.e. pieces from the set) which have already been traversed by the virtual/physical object that is constrained to the path (e.g. by removing parts from the start of the path) and placing the parts at the opposite end of the path (e.g. at the end of the path). In various examples the path may be inherently directional (i.e. the object which traverses the path may have to move in a predefined direction).

Figure 3:
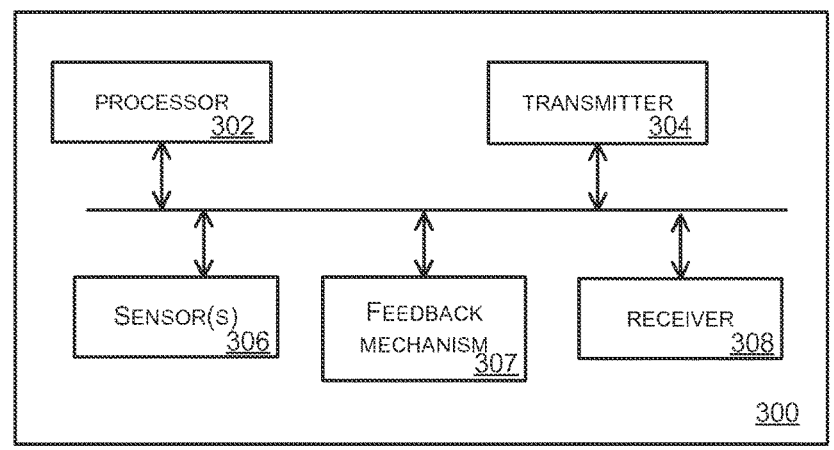
FIG. 3 is a schematic diagram of an example active piece and a flow diagram showing an example method of operation of an active piece.
Figure 3:
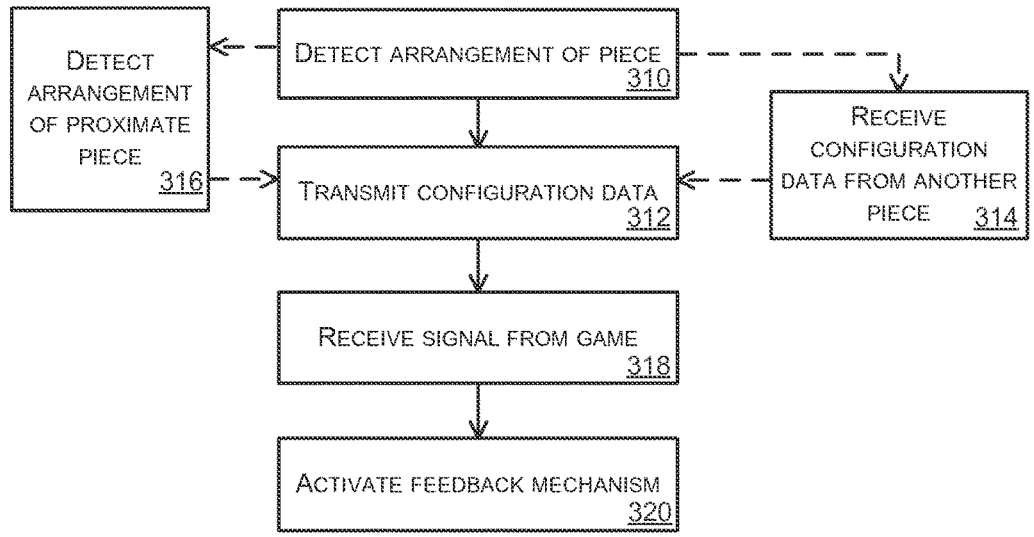

FIG. 3 is a schematic diagram of an example active piece 300 and a flow diagram showing an example method of operation of an active piece. The active piece 300 comprises a processor 302, transmitter 304 and one or more sensors 306. As shown in the flow diagram, the piece detects the arrangement of the piece using the one or more sensors 306 (block 310) and then transmits configuration data which describes the arrangement of the piece using the transmitter 304 (block 312). The configuration data may be transmitted (in block 312) directly to the game or may be transmitted to another play piece. Where one play piece collects configuration data for one or more other play pieces, it may receive configuration data from other play pieces (block 314) prior to transmitting all the configuration data to the game (in block 312). Where the set of physical play pieces comprises a combination of active pieces and passive pieces, an active piece may detect the arrangement of a proximate passive piece (block 316) prior to transmitting the configuration data to the game (in block 312).

The one or more sensors 306 detect the arrangement of the play piece 300 (in block 310) and the arrangement which is detected may be an absolute position and/or orientation of the play piece (e.g. "at coordinate (x,y)" and/or "face B upwards") or a relative position of the pieces (e.g. "next to piece X" or "between pieces A and B") or a combination of the two (e.g. "next to piece X and face A upwards"). Examples of sensors which may be used include, but are not limited to, accelerometers, magnetometers, infra-red transceivers, color sensors, etc. Two play pieces 300 may also communicate with each other using a wired (e.g. 1-Wire) or proximity-based wireless networking technology (e.g. RFID) to determine their relative orientation. As described above, the one or more sensors 306 may also detect the arrangement of a proximate passive play piece (in block 316), e.g. using RFID, magnetometers, color sensors or other sensing technologies.

In some examples, the active piece 300 may further comprise a feedback mechanism 307 (e.g. one or more LEDs) and a receiver 308. The feedback mechanism 307 may be used to indicate the position of a virtual object on the path defined by the arrangement of physical pieces. Consequently, an active piece 300 may receive a command (e.g. data) from the game 106 via the receiver 308 (block 318) indicating a position of a virtual object and may activate the feedback mechanism 307 to display the position (block 320). The virtual object, the position of which is indicated by the feedback mechanism 307, may be a virtual object which is controlled by the user within the game 106 or an autonomous object controlled by the game 106. In other examples, the feedback mechanism 307 may be arranged to move the physical object along the track (e.g. using motors and/or servoes and/or by providing control signals to a control mechanism within the physical object).

The transmitter 304 and/or receiver 308 in a play piece 300 may be a wireless device and may for example use Bluetooth® Low Energy (BLE) or other short range wireless protocol (e.g. IEEE 802.15.4 or ANT+). In other examples, the transmitter 304 and/or receiver 308 in a play piece 300 may use a wired connection to the computing device 108. Where a wired connection is used, the connection to the computing device 108 may be provided by only one of the active pieces in the arrangement which may collect data from all the other active pieces in the arrangement for transmission to the computing device 108. Use of a wired connection may be useful where one or more active pieces have a relatively high power consumption (which would result in a short battery life if battery powered) because the wired connection can also be used to provide power to the play piece and, in various examples, to other play pieces in the arrangement. For example, if the physical play pieces move the physical object along the path using motors or servoes or if pieces incorporate displays or vibration motors to show where the virtual object is, etc.

Figure 4:
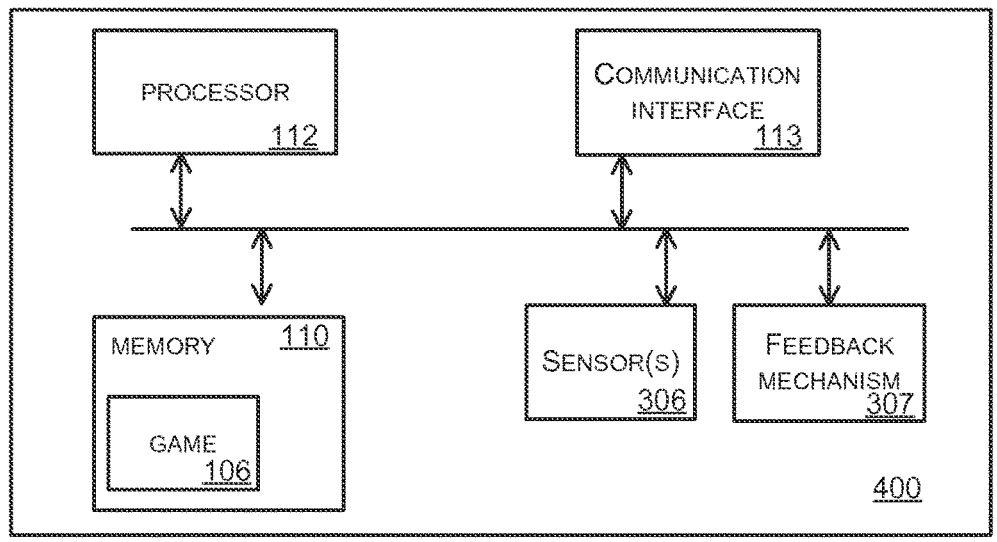
FIG. 4 is a schematic diagram of another example active piece which incorporates the game.

FIG. 4 is a schematic diagram of another example active piece 400 which incorporates the game 106. This active piece 400 may be part of a set of physical play pieces where the other active pieces in the set are as shown in FIG. 3 and described above. The set may only comprise active pieces (e.g. one piece 400 and multiple pieces 300) or may also comprise one or more passive pieces. As shown in FIG. 4, the active piece comprises a processor 112, memory 110 which stores the game 106, a communication interface 113 and one or more sensors 306. The operation of this active piece can be described with reference to FIGS. 2 and 3. The active piece 400 receives configuration data from one or more other physical play pieces in the set (block 202) via the communication interface 113 and also detects its own arrangement (block 310) using the one or more sensors 306. In various examples, the active piece 400 may also detect the arrangement of a proximate passive piece (block 316) using the one or more sensors 306. From the detected arrangements and configuration data received, the game 106 infers a virtual model of a path defined by the arrangement of the play pieces (block 206) and constrains a virtual/physical object to the path as part of the game play (block 208 and/or block 210).

In various examples the active piece 400 may further comprise a feedback mechanism 307 which is controlled by the game 106 and the game may transmit signals to other active pieces (via communication interface 113) to control feedback mechanisms in other active pieces in the arrangement.

The game may also generate a GUI showing the virtual model of the path (or at least a part of the path) and the object constrained to the path and this GUI may be rendered on a separate computing device. In an example, a separate computing device may render the GUI within a web browser and this separate computing device may communicate with the active piece 400 directly via the communication interface 113 or may receive the GUI data via an intermediary (e.g. from a web server which communicates with the active piece 400). For example, the active piece 400 may be connected to a cloud service which performs the graphics processing to render complex game content which can be viewed in a web browser on the separate computing device. This means that the play pieces only have to sense and report low-level data about their relative placement. Alternatively, the play pieces may incorporate one active piece that acts as a web server and generates the GUI via that web service. Access to the web service (by the separate computing device) may be via an 802.11 wireless access point embedded in the active piece or the active piece may connect to a shared network (e.g. a home WiFi™ network, via transmitter 304). Discovery of the active play piece may use techniques such as uPnP or the active piece may have an NFC interface which allows it to broadcast its current location on the home network to nearby devices (e.g. by broadcasting a URL such as http://192.168.0.107/ where the home router assigned the play piece master that IP address).

There are many different ways in which the plurality of physical play pieces (whether active or passive) can define the shape of a path (as inferred by the associated game). A first example arrangement of pieces 105 is shown in FIG. 1 and in this case a combination of the arrangement and shape of each of the pieces is used to infer the path. As can be seen in FIG. 1, in this example 105 the pieces themselves form the path and in this example the pieces may be shaped to look like pieces of a track (e.g. a railway track), path, road, etc. Another example of pieces which themselves form the track is shown in the first example 501 in FIG. 5. In this example 501, each of the pieces 510 resembles a portion of a tube or pipe and again a combination of the shape and arrangement of pieces form the path (e.g. as indicated by the arrows). In this example, the path may naturally be directional because a user will intuitively expect an object (or fluid) to fall (or flow) downwards through the pieces.

Figure 5:
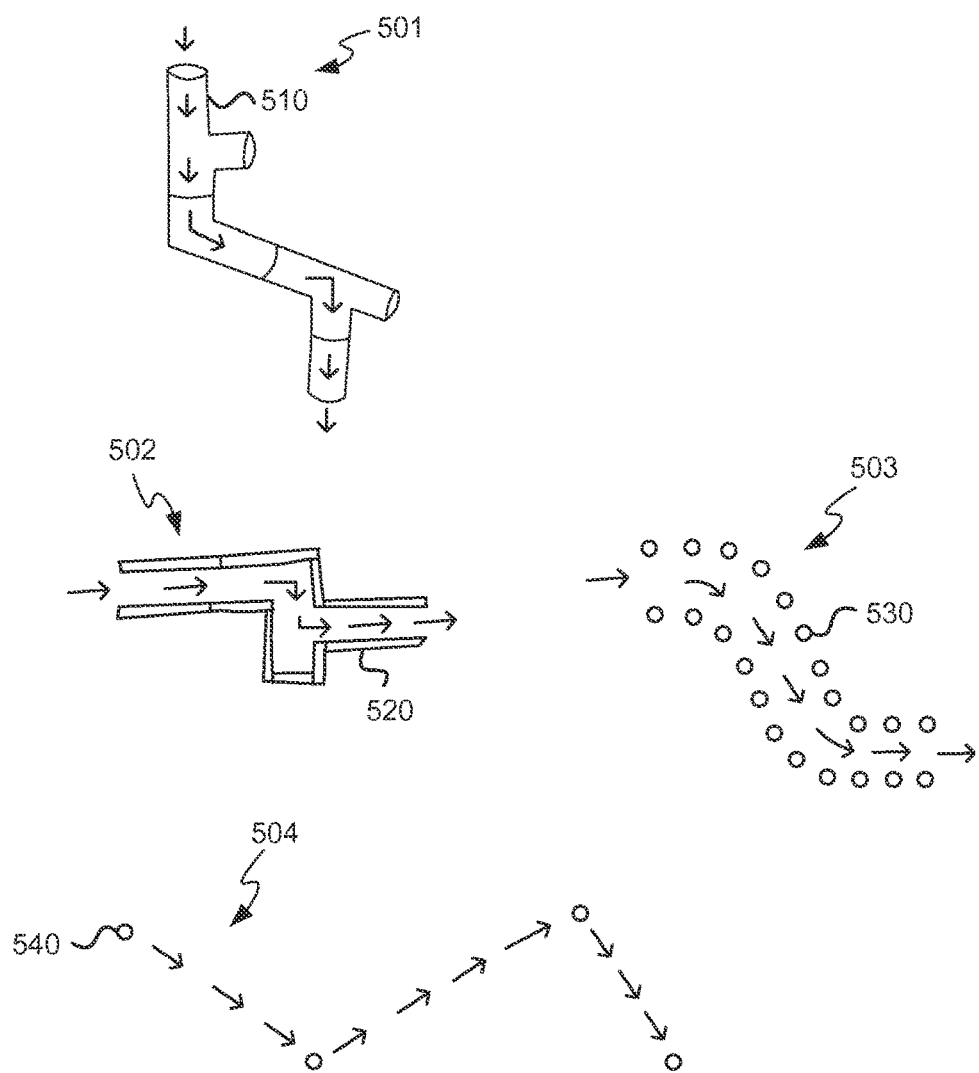
FIG. 5 shows schematic diagrams of example arrangements of physical play pieces.

In the next two examples 502-503 in FIG. 5, the pieces do not form the path but instead define the boundaries (or edges) of the path (again indicated by arrows). In the first of these examples 502, the pieces 520 form continuous walls which define the path (e.g. like a maze) and in the second of these examples 503, the pieces 530 form an outline of the path (e.g. like bollards or traffic cones/pylons) but do not necessarily touch each other (i.e. there are gaps between pieces 530). A threshold spacing between pieces 530 may be defined such that a gap between pieces that is less than the threshold is not inferred as a gap in the boundary of the path and a gap between the pieces that exceeds the threshold is inferred as a gap in the boundary of the path. The value of the threshold may be fixed or variable and in various examples may be dependent on the object traversing the paths (e.g. a smaller object may be able to pass through smaller gaps between pieces than a larger object) and this may result in a game 106 inferring multiple paths (e.g. in block 206 of FIG. 2).

In the final example 504 in FIG. 5, the pieces 540 define the path (again indicated by arrows) by forming waypoints that the path goes through. In such an example, the pieces may be numbered to indicate the order in which waypoints are traversed or this order may be input by a user or inferred by the game (e.g. according to the order in which the pieces are placed by the user).

In various examples, a user may be free to place the physical play pieces where they want and also to re-arrange the play pieces. In other examples, however, there may be restrictions which limit the positioning and/or order of placement of the play pieces. These restrictions may be a result of the physical shape of the play pieces (e.g. so that only certain play pieces can connect together or be placed abutting each other) and/or may be a result of rules within the game (e.g. the game may specify that a blue edge to a piece may only be placed abutting a blue edge on another tile).

The sets of physical pieces and associated game may be used for many different types of games and in various examples, the play pieces may be shaped according to the type of game. Various examples include:
  vehicle based games where the pieces form a track, road, river or rail and the physical/virtual object is a vehicle (e.g. car, train, boat, rollercoaster car) which travels along the track/road/river/rail
  games where the pieces form pipes or tubes and the physical/virtual object is a fluid which flows through the pipes or tubes or an object (e.g. a marble or ball) which rolls along inside the pipe or tube (a physics engine may control or influence the motion of the fluid/object)
  point-of-interest based games where physical pieces represent waypoints such as planets (in a space-themed game) or castles (in a historically-themed game) or other waypoints that the virtual/physical object (e.g. a spacecraft, cart, etc.) can move between. In this case, the path may be defined by other pieces (in addition to the pieces representing waypoints), or the path may be implicit, in that it is a direct route between waypoints. In the latter case the path may be constrained by the game or environment (rather than just being a straight line between waypoints), e.g. there may be a maximum and/or minimum path length between waypoints that is pre-defined. In another example, the user may unlock a path between waypoints through gameplay. In this case, projectors or other output technology may be mounted on either the physical pieces, the computing device hosting the associated game, or a third device, in order to illustrate the paths and the activity on the paths in the real world.

FIG. 2 (described above) shows a flow diagram of a method of operation of the game 106. Further operation of the game 106 (e.g. the GUI and/or the game play itself) is affected by the inferred path (from block 206) and may also be affected by which particular physical play pieces are used to form the path and/or how the user interacts with the physical play pieces and any physical object which is constrained to the path. In various examples, user interaction with one or more play pieces or the physical object translates into inputs to the game and the translation (from user interaction to game input) may be performed within a play piece, physical object and/or within the game. The game inputs (and hence the user interactions) affect the operation of the game. As described above, a user may push or otherwise move a physical object directly or may remotely control the object (e.g. via the game or other remote control device). In further examples, the object may be powered (e.g. it may comprise a motor) and so may be autonomous or controlled by the game 106 (e.g. it may be controlled by the feedback mechanism 307 within an active piece).

Figure 6:
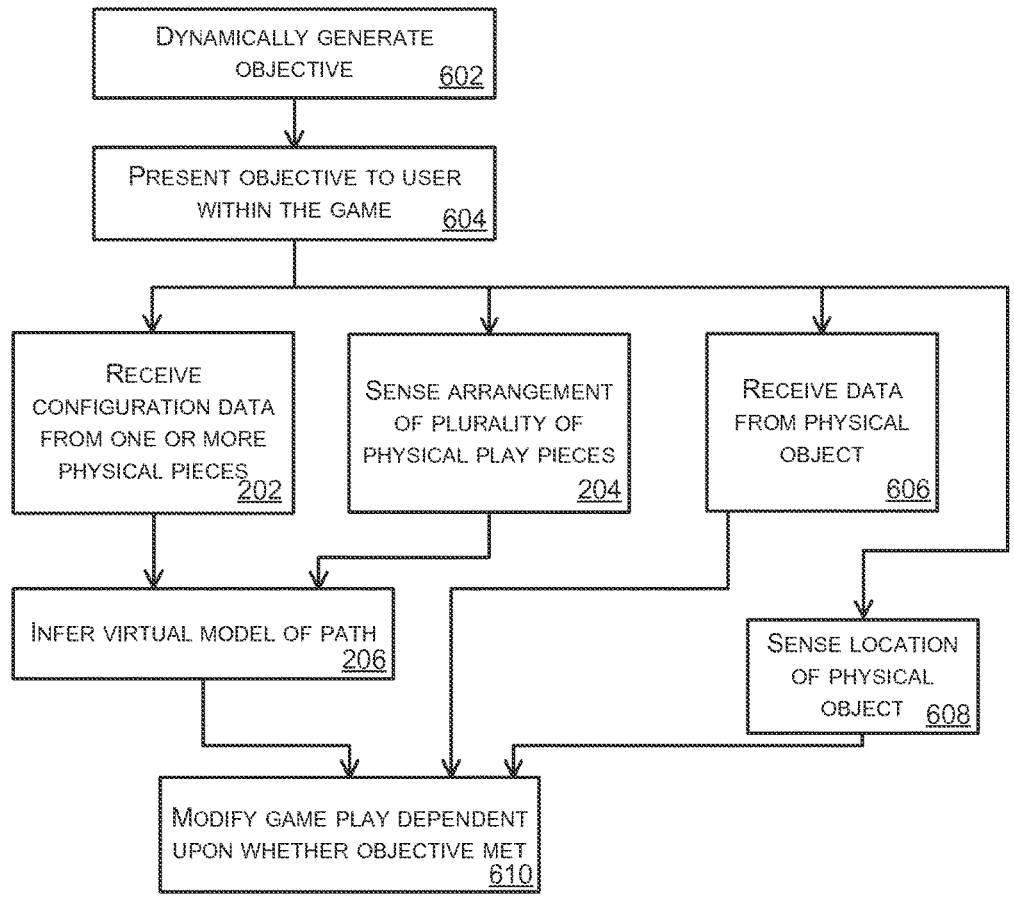
FIG. 6 shows a flow diagram of another example method of operation of a computer game.

As well as responding to the user's arrangement of play pieces (by inferring the path in block 206 and representing it within the game in block 212) (and in various example also interactions with the physical object and/or play pieces) in a style of game play which may be described as non-directed (because the game does not force or suggest any particular interaction with the play pieces and any physical object constrained to the path), the game 106 may also provide directed game play, as shown in FIG. 6.

In the directed game play, the game 106 presents goals or objectives to the user (who might also be referred to as a player) within the game 106 (block 604) where those goals/objectives require the player to interact with the physical pieces and/or a physical object (where there is one) in order to further progress within the game 106, i.e. the user cannot achieve the goal/objective without interacting with the physical pieces and/or a physical object. For example, a user may need to rearrange the physical play pieces to create a different shape of path (e.g. to reach a target location which may be a real or virtual location), move the physical object along the path in some way (e.g. in the form of a race, to beat other virtual objects which are autonomously controlled by the game), etc. In order to determine whether the objective has been met, the game 106 may receive configuration data from one or more physical pieces (block 202), sense an arrangement (or change in arrangement) of a plurality of physical play pieces (block 204), receive data from a physical object constrained to the path (block 606) or sense a location (or position along the path) of a physical object (block 608).

In examples where the game 106 receives configuration data from one or more physical pieces (in block 202) or senses an arrangement (or change in arrangement) of a plurality of physical play pieces (in block 204), the game 106 then infers a new (or updated) version of a path from this data (block 206), as described above with reference to FIG. 2.

The game 106 then modifies the game play (block 610) dependent upon whether the objective (set in block 604) has been met or not. By meeting the objective, the user may be able to progress to a new level, achieve a higher score, win a contest, unlock additional features (e.g. hidden features, mini-games, new levels, etc.) within the game 106, get an "achievement" awarded to them, assist other players in cooperative multiplayer scenarios, play against other players in competitive multiplayer scenarios, etc.

The progression which is achieved through the interaction with physical play pieces and/or physical object (and hence achieving the objective set) may be linear progression (e.g. progression to the next level) or may be non-linear progression which results in an enhancement to the game play. For example, the interaction may unlock some optional content e.g. a new avatar for the virtual vehicle which is not required to complete the main storyline of the game.

The directed game play may be explicit, in that the goals/objectives and the corresponding need to interact with the physical play pieces and/or physical object are clearly communicated to the user (e.g. through messages within the graphical user interface, GUI). Alternatively, the goals/objectives and/or the need to interact with the physical play pieces and/or physical object may be implicit, in that the goals/objectives or required arrangement of physical play pieces and/or physical object are known to the game but are not communicated to the user and must be discovered by the user. The use of implicit directed game play adds further challenges to the user and enhances the user experience.

The objectives which are presented to the user (in block 604) may be pre-defined and stored within the game software. Alternatively they may be generated dynamically (block 602). In various examples, they may be generated based at least in part on the information received from the physical play pieces (in block 202 or 204 of FIG. 2), e.g. they may be dependent on the current arrangement of physical play pieces. In various examples, the objective which is set may be generated based on the user's history (e.g. past performance) within the game or based on any other characteristics of the user or information about the user. Data detailing the user's history may, for example, be stored by the game itself or alternatively may be stored on a remote server and accessed by the game. By tailoring the objectives to be specific to a user, this enhances the overall user experience within the game. In examples where the objectives are dynamically generated (in block 602), this may comprise one or more of: choosing an objective or goal from a pre-existing list of possible objectives/goals (e.g. based on a characteristic of the user or another factor described above), creating an objective/goal based on random factors and using existing gameplay to date to influence the choice/creation of objective/goal.

In various examples, the objective presented to the user (in block 604) may be time-based (e.g. complete the path within a defined time period), location based (e.g. create and/or traverse a path to a defined location, which may be real or virtual) and/or competitive (e.g. against other users or autonomous objects within the game). In an example, the objective may require the real/virtual object to traverse all parts of the path and stay ahead of an autonomous virtual object. In another example, the object may require a user to modify the arrangement of physical pieces so that the object which is constrained to the path can reach a particular location in the real world (e.g. to reach the sofa in the living room where the user is playing the game) or the virtual world.

Although FIG. 6 shows directed game play which involves the player physical interacting with the physical pieces and/or physical object, in various examples, the game may also involve virtual game play. The virtual game play may involve directed game play which relates to virtual game play in addition to the directed play requiring physical game play to meet an objective set.

Figure 7:
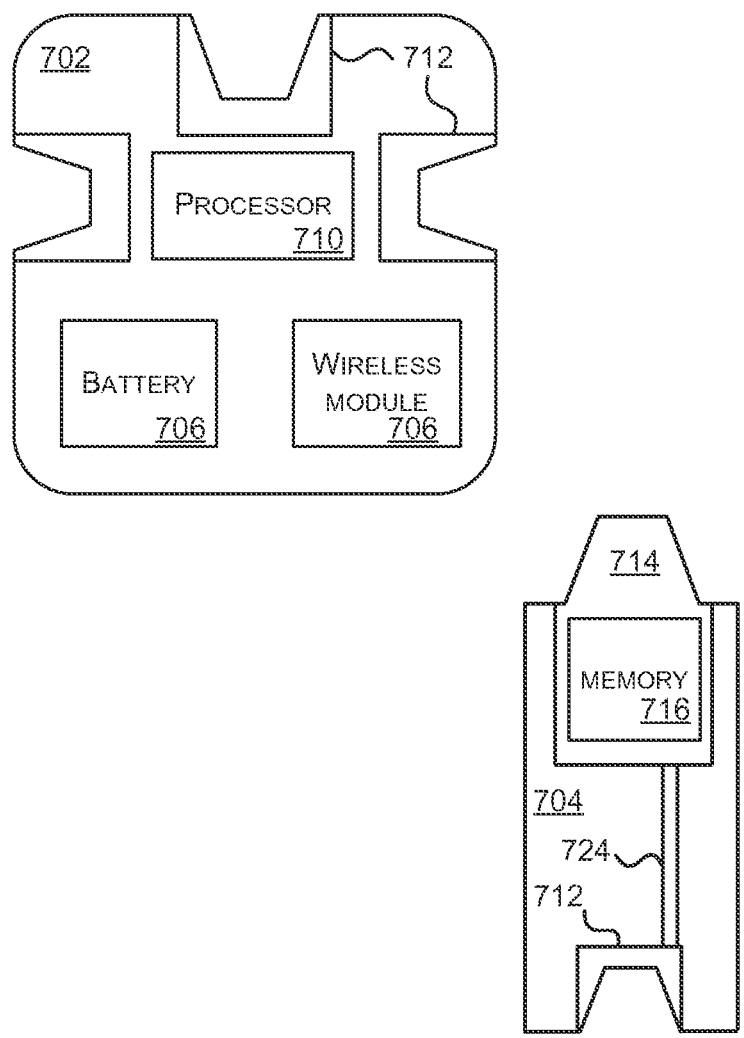
FIG. 7 is a schematic diagram of two example physical play pieces which form part of a set of physical play pieces.

FIG. 7 is a schematic diagram of two example physical play pieces which form part of a set of physical play pieces. FIG. 7 shows a core physical play piece 702 and a peripheral physical play piece 704. A set of physical play pieces may comprise one or more core play pieces 702 and a plurality of peripheral play pieces 704. The terms 'core' and 'peripheral' in relation to play pieces are separate from the terms 'passive' and 'active' which are described above. Whilst all core play pieces are also active play pieces, a peripheral piece may be an active or a passive play piece.

The core play piece 702 comprises a battery 706, a wireless communications module 708, a processor 710 and one or more connectors 712. The battery 706 provides power to components within the core (such as processor 710 and wireless communications module 708) and also to some/all of the peripheral play pieces 704 via the connectors 712. The wireless communications module 708 enables the core play piece 702 to communicate with a computing device running the game 106. Any suitable wireless technology may be used (e.g. Bluetooth®, BLE, WiFi™ or WiFi™ Direct, Near Field Communication (NFC), 802.15.4, etc.). The wireless communications module 708 may communicate directly with the computing device 108 (as shown in FIG. 1) running the game 106 or may communicate via a network (e.g. a home network or the internet) or intermediary device (e.g. a wireless access point). The connectors 712 physically attach the peripheral play pieces 704 to the core play piece 702 and may also pass data and power between play pieces.

The processor 710 within the core play piece 702 is arranged to collect the IDs (which may be a unique ID or an ID shared with other identical-looking play pieces, e.g. an ID for a particular shape or type of play piece) of each of the play pieces connected together (and hence which form the path that will be inferred by the game 106). The processor 710 may be a microprocessor, controller or any other suitable type of processor for processing computer executable instructions to control the operation of the core play piece in order to collect the IDs of connected play pieces. Core and peripheral play pieces may be connected together in any way. The play piece IDs (which may just identify a piece type, rather than uniquely identifying a play piece) may be collected from each of the connected play pieces directly (e.g. via a bus) or each play piece may collect information on its neighbors with the core play piece aggregating the data provided by its direct neighbor play pieces. In various examples, these play piece IDs may be collected via the data connection provided by the connectors 712 and in other examples, another means may be used (e.g. NFC, QR codes or computer vision). Where other means are used, the core play piece 702 may comprise additional hardware/software such as an NFC reader module or a camera or other image sensor to collect the play piece IDs of all the connected play pieces. In addition to collecting the play piece IDs of the connected play pieces (e.g. to generate a set or list of connected play pieces), the core play piece may detect the topology of the arrangement of play pieces.

Each peripheral play piece 704 comprises one or more connectors 712, 714 to physically attach the play piece to another play piece to form the path. The peripheral play piece 704 further comprises electrical connections 724 (e.g. in the form of a bus comprising 2 wires, data and ground) between the two connectors 712, 714.

Each peripheral play piece 704 also comprises a storage element 716 which stores an identifier (ID) for the peripheral play piece (which may be referred to as the play piece ID) and which may identify the type (e.g. shape) of the piece or may uniquely identify the play piece. The storage element 716 may comprise additional data, such as the shape and/or appearance of the play piece, locations of any connection points, mechanical compatibility details for connection points (e.g. detailing which other piece types can be connected to), other information used to help sense topology (e.g. color pattern), game play information (e.g. is the virtual/physical object on the piece, so that this can be used in subsequent game play) etc. This additional data may be used by the game 106 when inferring the path formed by an arrangement of physical pieces (e.g. in block 206 of FIG. 2) and/or in reflecting (e.g. rendering) at least a portion of the path in a GUI (e.g. in block 212 of FIG. 2). The storage element 716 may comprise memory or any other form of storage device. In the example shown in FIG. 7, the storage element 716 which stores the play piece ID is actually within the housing of the connector 714; however, in other examples it may be separate from the connector. In various examples, a peripheral play piece 704 may also comprise a processor (not shown in FIG. 7) and this too may be within the housing of the connector 714 or separate from the connector. In various examples, a peripheral play piece 704 may also comprise a battery (not shown in FIG. 7) and this may provide power to electronics within the peripheral play piece 704 and/or to neighboring play pieces (which may be peripheral or core play pieces). In this way, if an arrangement of play pieces requires more power than can be provided by the battery 706 in the core play piece 702, additional power can be provided by a battery in a peripheral play piece 704.

Although not shown in FIG. 7, a core play piece 702 may also comprise a storage element which stores an identifier for the play piece. As with the peripheral play piece, the storage element may comprise memory or any other form of storage device. The storage element which stores the play piece ID may be within a connector 712, the wireless module 708 or may be a separate entity within the core play piece 702.

It will be appreciated that the play pieces 702, 704 shown in FIG. 7 may comprise additional elements not shown in FIG. 7. It will further be appreciated that although FIG. 7 shows the modules of being square or rectangular, each of the play pieces can have any physical form factor (e.g. any shape of external housing) which is compatible with the other play pieces (i.e. each play piece is shaped such that it can connect to at least one other play piece, without the outer housing clashing).

In various examples, a play piece (which may be a peripheral play piece 704 or a core play piece 702) may comprise one or more sensors, actuators and/or displays that are controlled by and/or provide data to the processor 710 within the core play piece 702. Examples of sensors that may be used include: temperature sensors, vibration sensors, accelerometers, tilt sensors, gyroscopic sensors, rotation sensors, magnetometers, proximity sensors (active/passive infrared or ultrasonic), sound sensors, light sensors, etc. Examples of actuators that may be used include: electromagnets, motors, servos, vibration units, solenoids, speakers, etc. Examples of displays that may be used include one or more LEDs, a small LCD display, an e-ink display, etc. Where a play piece comprises a sensor, the sensor data may be communicated by the core play piece 702 to the game 106.

Figure 8:
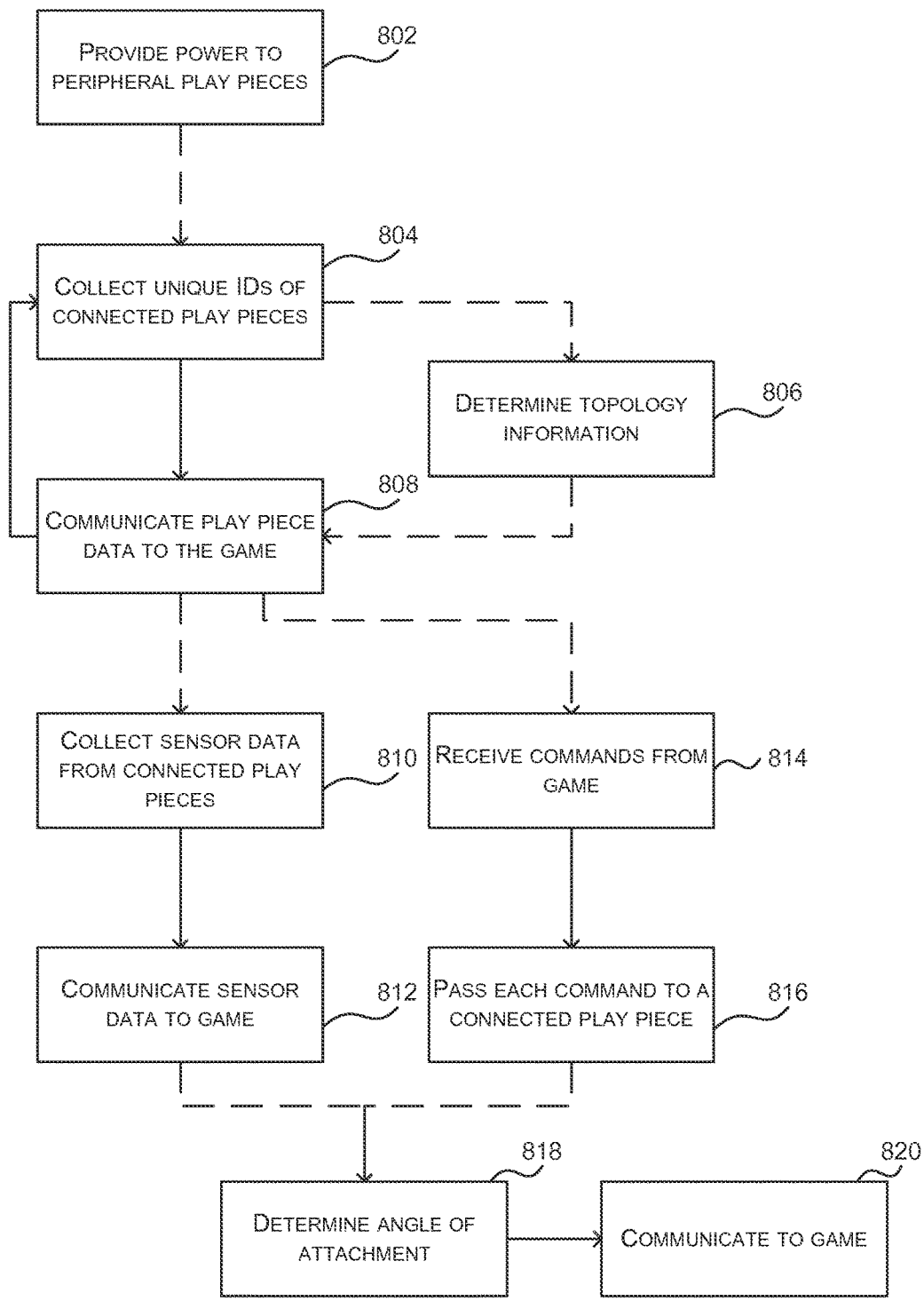
FIG. 8 is a flow diagram of an example method of operation of a core play piece such as shown in FIG. 7.

FIG. 8 is a flow diagram of an example method of operation of a core play piece 702, such as shown in FIG. 7. The core play piece 702 collects the IDs of the connected play pieces (block 804) and communicates play piece data to the game 106 (block 806) via the wireless module 708. In some examples the core play piece 702 may collect a list of IDs (which may or may not include its own ID). The topology determination (in block 806) may be performed at the same time as collecting the IDs (in block 804) or may be performed separately.

Figure 9:
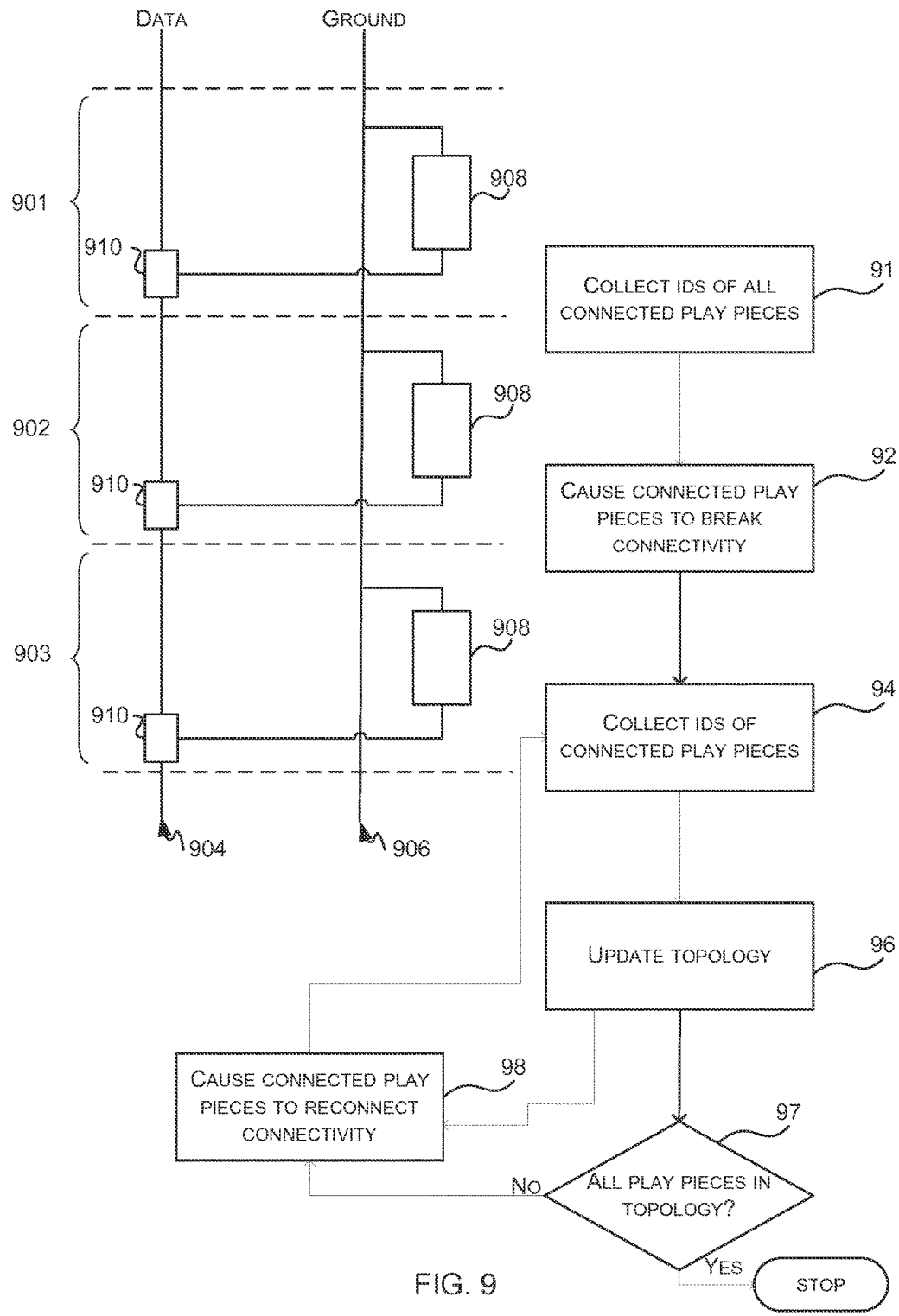
FIG. 9 shows a schematic diagram of hardware which may be used to perform topology detection and a flow diagram of an example method of using the hardware.

The topology determination (in block 806) may use any suitable method. In various examples, each connector 712, 714 in a play piece 702, 704 may comprise hardware logic (such as an electronic switch) to enable the processor 710 within the core play piece 702 to dissect the bus (i.e. the electrical connections connecting all the play pieces) programmatically. This can be described with reference to FIG. 9. FIG. 9 shows three play pieces 901-903, which may all be peripheral play pieces, connected to a 2-wire bus comprising a data line 904 and ground 906. Hardware logic 908 (which includes the storage device holding the play piece ID and may comprise a processor or other logic elements) within each play piece (e.g. within each connector 712, 714 in a play piece) connects between the two lines 904, 906 and a protocol such as the 1-Wire™ system may be used by the core play piece to communicate with each of the play pieces 901-903. In order that the core play piece can dissect the bus programmatically, each connector comprises hardware logic 910 which can be controlled by the core play piece and used to dissect the bus (e.g. by breaking the connectivity of the data line 904).

In the example shown in FIG. 9, the core play piece may first cause the hardware logic 910 in all play pieces to break the connectivity of play pieces (block 92). This may alternatively be described as dissecting the bus and may be achieved in the example of FIG. 9 by opening the switch 910 to break the connectivity in the data line 904. The core play piece may then collect the IDs of all connected play pieces (block 94), which in this case would only identify the ID of the first play piece 901 as the other play pieces are not currently electrically connected to the core play piece and this may be used to update topology information about the coherent physical whole object (block 96). The core play piece may then cause the hardware logic 910 within the identified first play piece 901 to reconnect the bus (block 98 e.g. by closing its switch) and the core play piece may then repeat the ID collection operation (in block 94). This second iteration would identify two IDs—the IDs of the first two play pieces 901, 902, such that the core play piece now knows that the second play piece 902 is connected to the first play piece 901 (and the topology is updated accordingly in block 96). This method may then be repeated to explore the full topology.

In order that the core play piece knows when it has identified the relative position of all the connected play pieces, the core may first (prior to causing the bus to be dissected) detect the IDs of all the connected play pieces (block 91, e.g. when the bus is fully connected) and then proceed with the iterative discovery process until all detected IDs have been discovered. An example method of operation of the core play piece which uses this is described below.

In a first detection step (block 91) the core play piece detects all the connected play pieces, which in the example of FIG. 9 comprises three play pieces 901-903. It may then cause the bus to be dissected by each of the play pieces (block 92). In a second detection step (block 94), the core play piece will now only detect the first play piece 901 so can generate the start of the topology as "core—play piece 901" (block 96). The core play piece may then check whether all play pieces have been included within the topology (block 97) and in this case play pieces 902 and 903 are missing ('No' in block 97). The core play piece may then instruct detected play piece 901 to re-connect the bus. In fact, the core can instruct all connected play pieces to reconnect the bus (block 98). In a third detection step (block 94) the core play piece will now detect two play pieces 901, 902 and so can extend the topology to "core—play piece 901—play piece 902" (block 96). The core play piece may then check whether all play pieces have been included within the topology and in this case play piece 903 is missing ('No' in block 97). The core play piece may then instruct detected play piece 902 (or all connected play pieces) to re-connect the bus (block 98) before performing a fourth detection step. In this fourth detection step (block 94) the core play piece will detect all three play pieces 901-903 and so can extend the topology further to "core—play piece 901—play piece 902—play piece 903" (block 96). The core play piece may then check whether all play pieces have been included within the topology and in this case all play pieces have been included ('Yes' in block 97) and so the detection can stop (block 99).

Referring back to FIG. 8, the play piece data which is communicated to the interactive software experience (in block 808) comprises the play piece IDs (from block 804, or block 91 or 94 of FIG. 9 and which may also include the play piece ID of the core play piece 702) and may also comprise topology information (from block 806 or block 96 of FIG. 9). In other examples, the play piece data may be an aggregated form of the play piece IDs, rather than the raw IDs themselves. As described above, the data which is communicated to the game 106 enables the game to infer a path (in block 206 of FIG. 2).

Some or all of the methods shown in FIGS. 8 and 9 may be repeated periodically. For example, a core play piece may regularly perform a collection of all play piece IDs (e.g. as in blocks 804 and 91) in order to determine if a user has re-arranged the play pieces (e.g. by removing/adding/replacing a play piece). In other examples, detection of re-arrangement may be performed in another way (e.g. a peripheral play piece may signal to the core when it has been attached, or the core play piece might explicitly poll for play pieces by their ID or a subset thereof, to either sense disconnection or connection).

When a user re-arranges the play pieces (e.g. by removing or adding a new play piece), it may not be necessary to perform a full topology analysis (e.g. as shown in FIG. 9) as the core play piece may know that a play piece that has been removed and may first check whether the new play piece has been added in place of the removed play piece. This may, for example, involve performing only selective dissection of the bus. In other examples, the full topology analysis may be performed.

In addition to collecting the play piece IDs and communicating them to the game (in blocks 804-808), the core play piece may additionally perform one or more additional functions. As shown in FIG. 8, the core play piece may provide power to a peripheral play piece (block 802). This power may be provided via the connector 712 and may use an electrical contact within the connector or alternatively may use inductive (non-contact) charging methods with the connector 712 (and corresponding connector 714 in the peripheral play piece) comprising an inductive coil.

Where a peripheral play piece 704 or the core play piece 702 comprises one or more sensors, the core play piece 702 collects the sensor data (block 810) and communicates this data to the game 106 (block 812). As described above with reference to the IDs, the data which is communicated to the game 106 (e.g. via wireless module 708) may be the raw sensor data or an aggregated or processed form of the sensor data.

In various examples, the core play piece 702 may receive commands from the game (block 814), for example where a play piece (core/peripheral) comprises an actuator or display. In response to receiving such a command, it may be processed within the core play piece (e.g. where the core play piece comprises an actuator/display) or may be passed to a connected play piece (block 816), e.g. to a play piece identified by its ID within the received command. In various examples, actuators may be used to constrain a physical object to a path formed by the play pieces and inferred by the game 106.

In various examples, such as the example shown in FIG. 8, each connector 712, 714 comprises two electrical paths (e.g. ground and data). In other examples, the connectors 712, 714 may provide more than two electrical paths.

Figure 10:
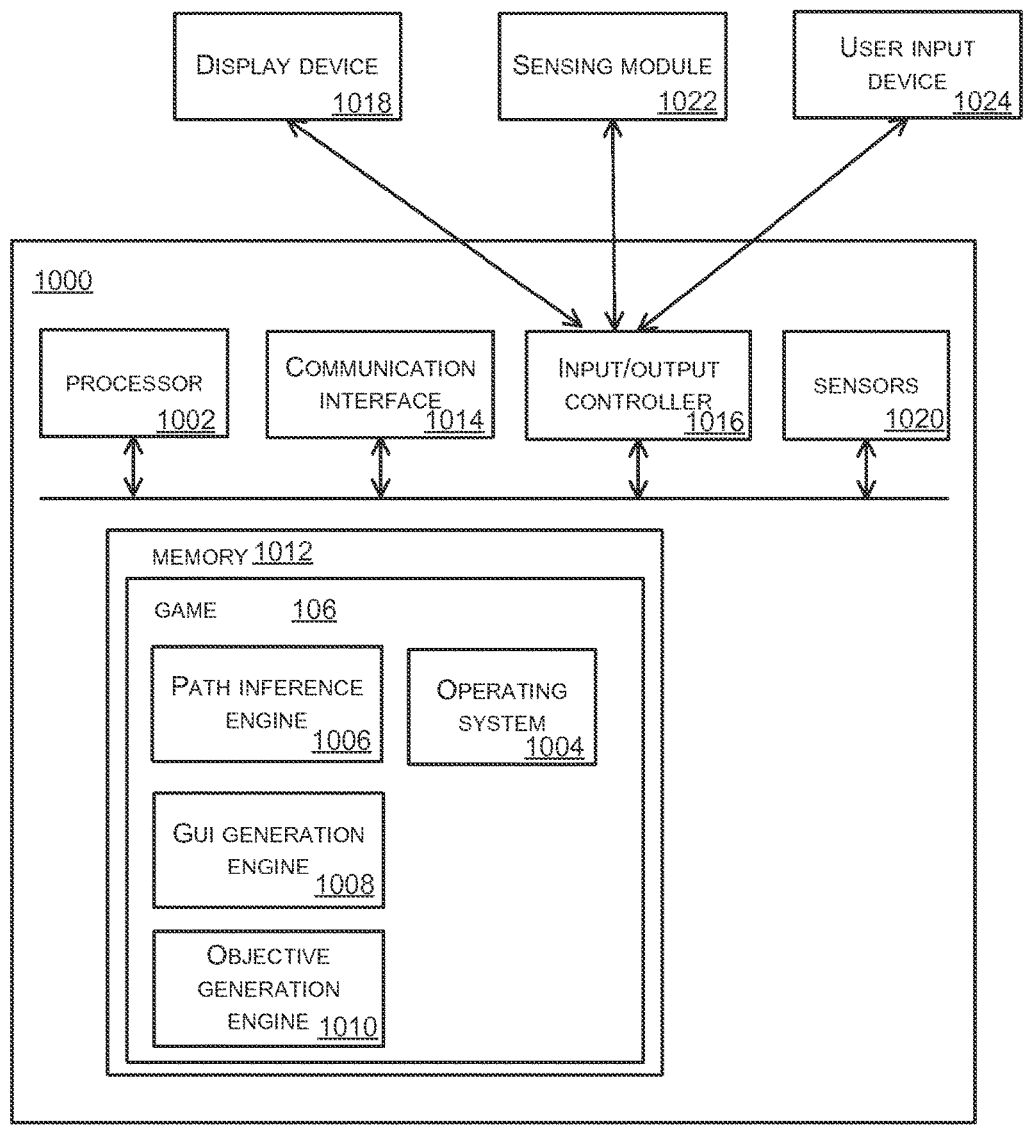
FIG. 10 illustrates an exemplary computing-based device in which embodiments of the methods described herein may be implemented.

FIG. 10 illustrates various components of an exemplary computing-based device 1000 which may be implemented as any form of a computing and/or electronic device, and in which embodiments of the methods described herein may be implemented. This computing based device 1000 may, for example, be the computing device 108, 114 shown in FIG. 1 or an active play piece 300, 400 such as shown in FIGS. 3 and 4.

Computing-based device 1000 comprises one or more processors 1002 which may be microprocessors, controllers or any other suitable type of processors for processing computer executable instructions to control the operation of the device in order to perform the methods described herein (e.g. infer a path and present at least a part of the path in a GUI). In some examples, for example where a system on a chip architecture is used, the processors 1000 may include one or more fixed function blocks (also referred to as accelerators) which implement a part of the method of path inference in hardware (rather than software or firmware).

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs).

Platform software comprising an operating system 1004 or any other suitable platform software may be provided at the computing-based device to enable application software, such as a game 106 to be executed on the device. As shown in FIG. 10, the game 106 may comprise one or more modules, such as a path inference engine 1006 arranged to infer a path (e.g. as in block 202), a GUI generation engine 1008 arranged to generate the GUI for the game play, including at least a part of the inferred path (e.g. as in block 212 of FIG. 2) and an objective generation engine 1010 to generate objectives for directed game play (e.g. as in block 602 of FIG. 6).

The computer executable instructions may be provided using any computer-readable media that is accessible by computing based device 1000. Computer-readable media may include, for example, computer storage media such as memory 1012 and communications media. Computer storage media, such as memory 1012, includes volatile and non-volatile, removable and non-removable media implemented in any method or technology for storage of information such as computer readable instructions, data structures, program modules or other data. Computer storage media includes, but is not limited to, RAM, ROM, EPROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing device. In contrast, communication media may embody computer readable instructions, data structures, program modules, or other data in a modulated data signal, such as a carrier wave, or other transport mechanism. As defined herein, computer storage media does not include communication media. Therefore, a computer storage medium should not be interpreted to be a propagating signal per se. Propagated signals may be present in a computer storage media, but propagated signals per se are not examples of computer storage media. Although the computer storage media (memory 1012) is shown within the computing-based device 1000 it will be appreciated that the storage may be distributed or located remotely and accessed via a network or other communication link (e.g. using communication interface 1014).

The communication interface 1014 may be arranged to receive data from one or more physical play pieces and may comprise a wireless transmitter and/or wireless receiver. In various examples the communication interface 1014 receives data from the physical play pieces directly and in other examples, the communication interface 1014 may receive data from the play pieces via an intermediary device. In examples where the play pieces comprise a feedback mechanism (e.g. LEDs arranged to show a location of a virtual object constrained to the inferred path) the communication interface 1014 may also be arranged to transmit data (e.g. commands) to one or more physical play pieces.

The computing-based device 1000 may also comprise an input/output controller 1016. The input/output controller may be arranged to output display information (e.g. the GUI) to a display device 1018 which may be separate from or integral to the computing-based device 1000. The input/output controller 1016 may also be arranged to receive and process input from one or more devices, such sensors 1020 or a sensing module 1022 (which may be internal or external to the computing based device 1000) or a user input device 1024 (e.g. a mouse, keyboard, camera, microphone or other sensor). In some examples the user input device 1024 may detect voice input, user gestures or other user actions and may provide a natural user interface (NUI). This user input may be used to further control game play. In an embodiment the display device 1018 may also act as the user input device 1024 if it is a touch sensitive display device. The input/output controller 1016 may also output data to devices other than the display device, e.g. a locally connected printing device (not shown in FIG. 10).

Any of the input/output controller 1016, display device 1018 and the user input device 1024 may comprise NUI technology which enables a user to interact with the computing-based device in a natural manner, free from artificial constraints imposed by input devices such as mice, keyboards, remote controls and the like. Examples of NUI technology that may be provided include but are not limited to those relying on voice and/or speech recognition, touch and/or stylus recognition (touch sensitive displays), gesture recognition both on screen and adjacent to the screen, air gestures, head and eye tracking, voice and speech, vision, touch, gestures, and machine intelligence. Other examples of NUI technology that may be used include intention and goal understanding systems, motion gesture detection systems using depth cameras (such as stereoscopic camera systems, infrared camera systems, RGB camera systems and combinations of these), motion gesture detection using accelerometers/gyroscopes, facial recognition, 3D displays, head, eye and gaze tracking, immersive augmented reality and virtual reality systems and technologies for sensing brain activity using electric field sensing electrodes (EEG and related methods).

Although the present examples are described and illustrated herein as being implemented in a play system (comprising a set of physical play pieces and an associated game) as shown in FIGS. 1, 3 and 4, the systems described are provided as examples and not limitations. As those skilled in the art will appreciate, the present examples are suitable for application in a variety of different types of play systems.

Many of the examples described above involve physical game play by a user with a physical object which is constrained to the inferred path. It will be appreciated, however, that game play may involve a combination of some physical game play and some virtual game play.

The term 'computer' or 'computing-based device' is used herein to refer to any device with processing capability such that it can execute instructions. Those skilled in the art will realize that such processing capabilities are incorporated into many different devices and therefore the terms 'computer' and 'computing-based device' each include PCs, servers, mobile telephones (including smart phones), tablet computers, set-top boxes, media players, games consoles, personal digital assistants and many other devices.

The methods described herein may be performed by software in machine readable form on a tangible storage medium e.g. in the form of a computer program comprising computer program code means adapted to perform all the steps of any of the methods described herein when the program is run on a computer and where the computer program may be embodied on a computer readable medium. Examples of tangible storage media include computer storage devices comprising computer-readable media such as disks, thumb drives, memory etc. and do not include propagated signals. Propagated signals may be present in a tangible storage media, but propagated signals per se are not examples of tangible storage media. The software can be suitable for execution on a parallel processor or a serial processor such that the method steps may be carried out in any suitable order, or simultaneously.

This acknowledges that software can be a valuable, separately tradable commodity. It is intended to encompass software, which runs on or controls "dumb" or standard hardware, to carry out the desired functions. It is also intended to encompass software which "describes" or defines the configuration of hardware, such as HDL (hardware description language) software, as is used for designing silicon chips, or for configuring universal programmable chips, to carry out desired functions.

Those skilled in the art will realize that storage devices utilized to store program instructions can be distributed across a network. For example, a remote computer may store an example of the process described as software. A local or terminal computer may access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a DSP, programmable logic array, or the like.

Any range or device value given herein may be extended or altered without losing the effect sought, as will be apparent to the skilled person.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The steps of the methods described herein may be carried out in any suitable order, or simultaneously where appropriate. Additionally, individual blocks may be deleted from any of the methods without departing from the spirit and scope of the subject matter described herein. Aspects of any of the examples described above may be combined with aspects of any of the other examples described to form further examples without losing the effect sought.

The term 'comprising' is used herein to mean including the method blocks or elements identified, but that such blocks or elements do not comprise an exclusive list and a method or apparatus may contain additional blocks or elements.

The term 'subset' is used herein to refer to a proper subset such that a subset of a set does not comprise all the elements of the set (i.e. at least one of the elements of the set is missing from the subset).

It will be understood that the above description is given by way of example only and that various modifications may be made by those skilled in the art. The above specification, examples and data provide a complete description of the structure and use of exemplary embodiments. Although various embodiments have been described above with a certain degree of particularity, or with reference to one or more individual embodiments, those skilled in the art could make numerous alterations to the disclosed embodiments without departing from the spirit or scope of this specification.

The invention claimed is:

1. A set comprising:
    a computer game;
    a plurality of passive physical play pieces, wherein the passive physical play pieces in the set are not configured to send or receive data with other physical play pieces or the computer game; and a plurality of active physical play pieces, wherein at least one of the plurality of active physical play pieces in the set comprises one or more sensors configured to detect an arrangement of a proximate passive physical play piece and is configured to actively communicate with the computer game, wherein the computer game is configured to:

receive data from the at least one of the plurality of active physical play pieces;

based at least in part on the data received, assist the computer game to infer a shape of a path formed from the plurality of active physical play pieces;

generate a virtual model of a path based on the inferred shape of the path formed from the plurality of active physical play pieces; and display the virtual model of the path on a display device separate from the plurality of active physical play pieces.

2. The set according to claim 1, wherein one or more of the plurality of active physical play pieces in the set is shaped such that it is capable of interlocking with one or more other ones of the active physical play pieces or passive physical play pieces.

3. The set according to claim 1, wherein two or more of the plurality of active physical play pieces have different shapes.

4. The set according to claim 1, wherein
the at least one of the plurality of active physical play pieces comprise a wireless transmitter.

5. The set according to claim 1, wherein one or more of the plurality of the active physical play pieces in the set comprises:

a wireless receiver arranged to receive commands from the computer game.

6. One or more computer storage media with device-executable instructions that, when executed by a computing system, direct the computing system to:

determine a physical arrangement of a plurality of physical play pieces;

infer a virtual model of a path from the arrangement, wherein within gameplay, a virtual object is constrained to the virtual model of the path; and display the virtual model of the path on a display device separate from the plurality of physical play pieces, wherein the plurality of physical play pieces comprises at least one or more active physical play pieces and at least one or more passive physical play pieces, and wherein at least one of the active physical play pieces comprises one or more sensors configured to detect an arrangement of a proximate passive physical play piece when the passive physical play piece is proximate to the at least one active physical play piece, and wherein the passive physical play pieces do not comprise a sensor.

7. The computer storage media according to claim 6, wherein the virtual model of the path is based on both the physical arrangement of the plurality of physical play pieces and a shape of each of the plurality of physical play pieces.

8. The computer storage media according to claim 6, wherein the virtual model of the path is based on a spacing between the plurality of physical play pieces.

9. The computer storage media according to claim 6, wherein the device-executable instructions that, when executed by the computing system, direct the computing system to determine the physical arrangement of the plurality of physical play pieces comprises:

device-executable instructions that, when executed by the computing system, direct the computing system to receive configuration data from one or more physical play pieces.

10. The computer storage media according to claim 6, wherein the device-executable instructions that, when executed by the computing system, direct the computing system to determine a physical arrangement of the plurality of physical play pieces comprises:

device-executable instructions that, when executed by the computing system, direct the computing system to sense an arrangement of the plurality of physical play pieces.

11. The computer storage media according to claim 6, wherein the device-executable instructions, when executed by the computing system, further direct the computing system to:

generate a graphical user interface reflecting a configuration of at least a portion of the path to the user.

12. The computer storage media according to claim 6, wherein the device-executable instructions, when executed by the computing system, further direct the computing system to:

generate a graphical user interface showing a virtual model of the virtual object and at least a portion of the virtual model of the path.

13. The computer storage media according to claim 6, wherein the arrangement of the plurality of physical play pieces is user generated.

14. The computer storage media according to claim 6, wherein the device-executable instructions, when executed by the computing system, further direct the computing system to:

present an objective to a user within a game; and
modify gameplay dependent upon whether the objective is met.

15. The computer storage media according to claim 14, wherein the objective defines a target arrangement of the plurality of physical play pieces and/or a target location of the virtual object.

16. The computer storage media according to claim 6, wherein the virtual object is associated with a physical object.

17. A play system comprising a computer game and a plurality of active physical play pieces, wherein the active physical play pieces are arranged to actively communicate with at least one of each other and assist the computer game to generate a virtual path by inferring a shape of a physical path formed from the active physical play pieces, wherein the computer game is arranged to receive data from one or more of the active physical play pieces and to infer the shape of the physical path based on the data received, wherein within gameplay at least a portion of the virtual path is displayed on a user interface display separate from the active physical play pieces, wherein a virtual object is constrained to an inferred virtual path, wherein the play system further comprises a plurality of passive physical play pieces, wherein the passive physical play pieces are not capable of receiving or sending data to or from other physical play pieces or the computer game, and wherein one or more of the active physical play pieces comprise one or more sensors configured to detect an arrangement of a proximate passive physical play piece when the passive physical play piece is proximate to the active physical play piece.

* * * * *